(12) United States Patent
Gu

(10) Patent No.: US 11,794,264 B2
(45) Date of Patent: Oct. 24, 2023

(54) ELECTRO-HYDRAULIC COMBINED DEVICE

(71) Applicant: Shanghai Jiao Tong University, Shanghai (CN)

(72) Inventor: Lin Gu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 138 days.

(21) Appl. No.: 17/528,272

(22) Filed: Nov. 17, 2021

(65) Prior Publication Data

US 2022/0226917 A1 Jul. 21, 2022

(30) Foreign Application Priority Data

Nov. 18, 2020 (CN) .......................... 202011296602.8

(51) Int. Cl.
*B23H 1/10* (2006.01)
(52) U.S. Cl.
CPC ...................................... *B23H 1/10* (2013.01)
(58) Field of Classification Search
CPC ... B23H 1/10; B23H 3/10; B23H 7/26; B23H 7/36
See application file for complete search history.

(56) References Cited

U.S. PATENT DOCUMENTS

| 2,385,665 | A | * | 9/1945 | Warwick | ................. | B25B 27/18 |
| | | | | | | 408/59 |
| 4,430,180 | A | | 2/1984 | Shimizu | | |
| 6,403,910 | B1 | * | 6/2002 | Stang | ....................... | B23H 9/14 |
| | | | | | | 219/69.15 |

FOREIGN PATENT DOCUMENTS

| CN | 201136075 | Y | * | 10/2008 | | |
| CN | 104551275 | A | * | 4/2015 | ............... | B23H 1/10 |
| CN | 109014456 | A | * | 12/2018 | ............... | B23H 1/00 |
| CN | 208743863 | U | * | 4/2019 | ............... | B23H 5/04 |
| CN | 211588817 | U | * | 9/2020 | | |
| JP | 07299665 | A | * | 11/1995 | | |

OTHER PUBLICATIONS

Machine translation of JP-07299665-A, Jun. 2023 (Year: 2023).*

* cited by examiner

*Primary Examiner* — Geoffrey S Evans
(74) *Attorney, Agent, or Firm* — Schneider IP Law; Jerold I. Schneider

(57) ABSTRACT

An electro-hydraulic combined device is provided. The electrical insulator is fixedly connected with a spindle shell; a top end of the electro-hydraulic joint supply base is fixedly connected with the electrical insulator; a connection port of the working fluid pipe and a binding post are arranged on the electro-hydraulic joint supply base; a bottom end of the electro-hydraulic joint supply base is provided with a terminal connection port; the connection port of the working fluid supplying pipe and the terminal connection port communicate with a fluid channel in the electro-hydraulic joint supply base; when the terminal connection port is snap-engaged with a top end of the terminal of electro-hydraulic joint supply pipes, the fluid channel in the electro-hydraulic joint supply base is communicated with a fluid channel in the terminal; the fluid channel in the terminal is further communicated with a flushing fluid container on an electrode shank for electro machining.

5 Claims, 3 Drawing Sheets

ELECTRO-HYDRAULIC COMBINED DEVICE

CROSS REFERENCE TO RELATED APPLICATION

This patent application claims the benefit and priority of Chinese Patent Application No. 202011296602.8 filed on Nov. 18, 2020, the disclosure of which is incorporated by reference herein in its entirety as part of the present application.

TECHNICAL FIELD

The present disclosure relates to the technical field of electro machining equipment, in particular to an electro-hydraulic combined device.

BACKGROUND ART

Electro machining is a kind of non-traditional machining technology, including spark-erosion machining and electric arc machining, which is widely used in industries such as mold and aerospace components manufacturing. The electro machining can be applied to machine workpieces made of hard material and complex-shapes which are difficult to be processed with traditional cutting methods. The electro machining is usually used to machine electrical conductive material and can machine complex cavities or contours on difficult-to-cut materials, such as titanium alloy, tool steel, carbon steel, and cemented carbide. Generally, the electric arc machining in the electro machining has high machining efficiency, and there is a restriction that a surface machined by the electric arc machining is rough. The machining quality of the spark-erosion machining is higher, whereas has a low efficiency. Since the arc discharge produces erosion craters, it is necessary to subsequently implement a finish machining process such as mechanical milling, to improve the surface quality in the actual application. Under this background, the electro machining and the mechanical machining are combined. That is, there is a demand for a composite machining machine tool that realizes electro machining firstly and then the cutting upon the equipment. In the machine tool, electro machining can be realized by using an electrode shank for electro machining in cooperation with a pulse power supply and a high-speed inner flushing-fluid system, and the precision machining of parts can be realized by using a mechanical milling shank.

In the electro machining, the electrode shank for electro machining mainly plays following four roles of mounting a tool electrode, transmitting a rotation of a spindle of a machine tool to the tool electrode, loading power to the tool electrode, and applying high-speed inner flushing fluid to a flushing hole of the tool electrode. That is, the electrode shank for electro machining has four functions of mounting electrode, rotation, electric conduction, and flushing. Therefore, the electrode shank for electro machining is an important component of this type of composite machining machine tool. The existing electrode shank for electro machining, especially an electrode shank for electric arc machining, often requires the spindle of the machine tool to have a function of central flushing; and/or is provided with a power supply through the spindle of the machine tool; and/or has a power supply directly mounted on the shank for electric arc machining. However, not spindles of all machine tools have the function of central flushing. The mounting of the power supply through the spindle of the machine tool also needs an additional and special insulation structure, which increases the complexity of the structure of the spindle of the machine tool. Parts for power and parts for fluid supply need to be manually mounted or removed in a tool changing process even though the power is only loaded onto the shank for electric machining, which further affects the automation degree of the equipment.

The electro machining processes that need inner flushing fluid and electrode rotation, such as the electric arc machining and the spark-erosion machining, all need the electrode shank for electro machining and all have the above technical problems.

SUMMARY

Some embodiments aim to provide an electro-hydraulic combined device (i.e., an electro-hydraulic joint supply and tool holding device), so as to solve the above technical problems in the existing art and improve the usability of electro machining, the applicability to a spindle of a machine tool, and the automation degree of machining.

In order to achieve the above-mentioned purpose, some embodiments provide the following solution.

The present disclosure provides an electro-hydraulic combined device, including an electrical insulator, an electro-hydraulic joint supply base, a terminal of electro-hydraulic joint supply pipes, and the electro-hydraulic joint supply pipes, where the electrical insulator is fixedly connected with a spindle shell or a spindle base of a spindle of a machine tool; a top end of the electro-hydraulic joint supply base is fixedly connected with the electrical insulator; a connection port of a working fluid suppling pipe and a binding post are arranged on the electro-hydraulic joint supply base; a bottom end of the electro-hydraulic joint supply base is provided with a terminal connection port; the connection port of the working fluid supplying pipe and the terminal connection port are communicated with a first fluid channel in the electro-hydraulic joint supply base; when the terminal connection port is snap-engaged with a top end of the terminal of the electro-hydraulic joint supply pipes, the first fluid channel in the electro-hydraulic joint supply base is jointed with a second fluid channel in the terminal; the second fluid channel in the terminal is further communicated with a flushing fluid container on an electrode shank for electro machining through the electro-hydraulic joint supply pipes; the binding post, the electro-hydraulic joint supply base, the terminal, the electro-hydraulic joint supply pipes, and the electrode shank for electro machining are conductive and electrically conducted; the electrode shank for electro machining and the spindle are insulated from each other.

Preferably, the connection port of the working fluid supplying pipe is configured to communicate with a working fluid container, and working fluid in the working fluid container is pumped through the connection port of the working fluid supplying pipe and into the electro-hydraulic joint supply base by a pressure pump.

Preferably, the binding post is configured to be electrically connected with a power supplier.

Preferably, a joint of the terminal connection port and the terminal is sealed when the terminal connection port is snap-engaged with the top end of the terminal.

Preferably, a sealing ring is arranged between the terminal connection port and the terminal to prevent the working fluid from leaking, and the sealing ring is configured to not affect direct contact for electric conduction between the terminal connection port and the terminal.

Preferably, the connection port of the working fluid supplying pipe, the first fluid channel in the electro-hydraulic joint supply base, the terminal connection port, the second fluid channel in the terminal, the electro-hydraulic joint supply pipes, and a third fluid channel in the electrode shank for electro machining jointly form a working fluid channel.

Preferably, the connection port of the working fluid supplying pipe, the electro-hydraulic joint supply base, the terminal connection port, the terminal, the electro-hydraulic joint supply pipes, the electrode shank for electro machining, and an electrode jointly form an electric conduction channel.

Preferably, the electrode shank for electro machining and a connection port of a spindle shank are insulated from each other by disposing an insulation layer therebetween.

Compared with the existing art, the following technical effects are achieved by some embodiments.

The electro-hydraulic combined device of some embodiments improves the usability of electro machining and applicability to the spindle of the machine tool, and increases the rigidity and the automation degree of the clamping of electrodes for electro machining, which realizes the high integration of the inner flushing working fluid and an electricity connection. The electro-hydraulic combined device of the present disclosure has a compact structure. The electro-hydraulic joint supply base thereof is used to enable a combination of electrical and hydraulic connection ports. Furthermore, the inner and outer structures of the electro-hydraulic combined device have high rigidity, which can greatly improve the rigidity and the machining accuracy of an electrode system for electro machining By means of the flushing fluid container, the functions of mounting the electrode, rotation, electric conduction, and flushing can be realized at the same time. When the electro-hydraulic combined device is used for electro machining, the spindle of the machine tool does not need to have the function of central flushing, and have no additional power loading structure for the electrode. So, fluid supply modules and power supply modules do not need to be removed during replacement of the electrode/cutting shank, so that the tool changing time for the electrode is greatly saved.

BRIEF DESCRIPTION OF THE DRAWINGS

In order to more clearly illustrate technical solutions in the embodiments of the present application or in the prior art, a brief introduction to the accompanying drawings required for the embodiment will be provided below. Obviously, the accompanying drawings in the following description are only some of the embodiments of the present disclosure. Those of ordinary skill in the art would also be able to derive other drawings from these drawings without making creative efforts.

In the figures: 1 spindle shell; 2 electrical insulator; insulator; 3 electro-hydraulic joint supply base; 4 connection port of a working fluid supplying pipe; 5 binding post; 6: terminal connection port; 7 sealing ring; 8 terminal of electro-hydraulic joint supply pipes; 9 connection port of a spindle shank; 10 universal spacing groove; 11 hollow rotating shaft; 12 rotating mechanism; 13 electrode spacing groove; 14 electrode connection port; 15 flushing fluid container; 16 electro-hydraulic joint supply pipe; 17 electrode shank; 18 third fluid channel in the electrode shank; and 19 insulation layer.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present invention, all other embodiments obtained by those of ordinary skill in the art without creative work shall fall within the protection scope of the present invention.

Some embodiments aim to provide an electro-hydraulic combined device, so as to solve the above technical problems in the existing art and improve the usability of electro machining and the applicability to a spindle of a machine tool.

In order to make the objectives, features, and advantages mentioned above of the present disclosure more apparent and easily understood, the present disclosure will be further described in detail below with reference to the drawings and particular implementations.

Figure 1:
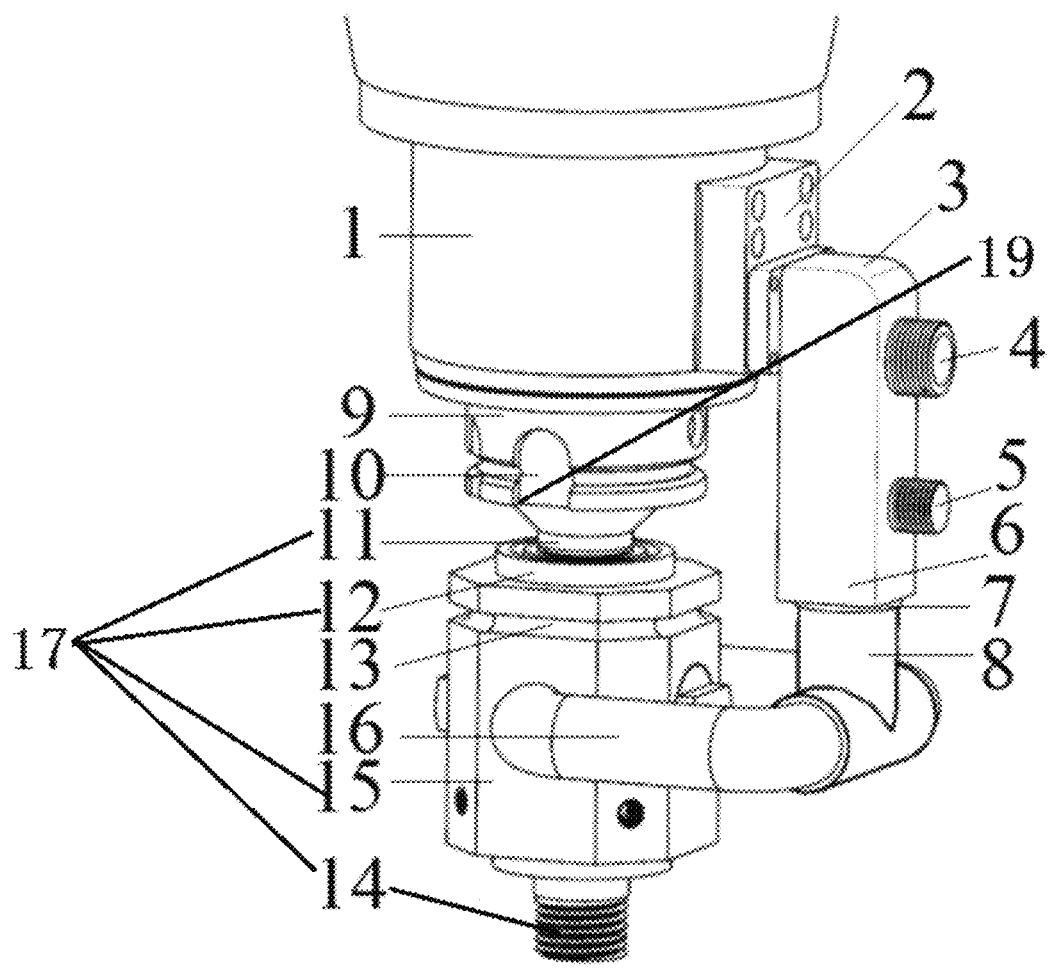
FIG. 1 is a first schematic structural diagram of an electro-hydraulic combined device according to the present disclosure.
Figure 2:
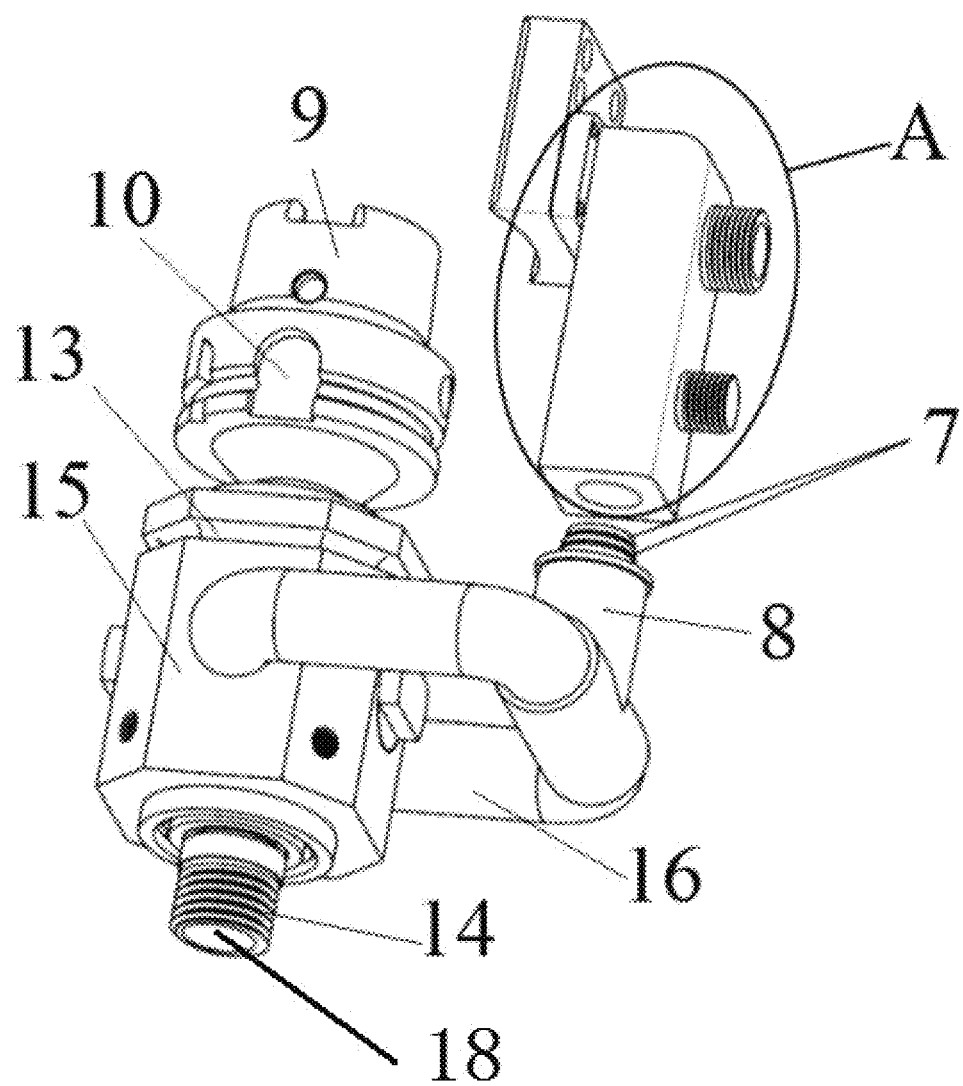
FIG. 2 is a second schematic structural diagram of an electro-hydraulic combined device according to the present disclosure.
Figure 3:
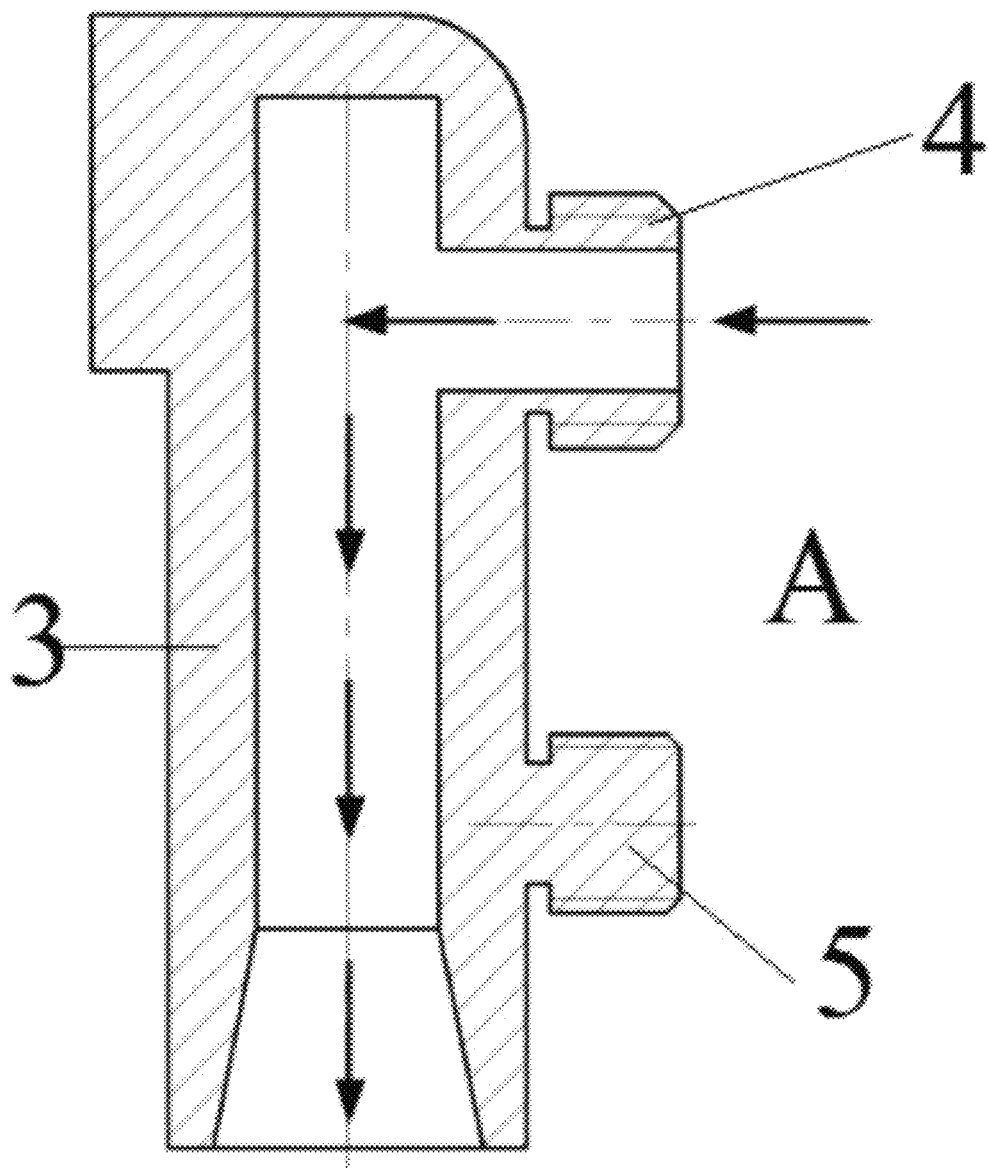
FIG. 3 is a sectional view of a detail part A in FIG. 2.

As shown in FIG. 1 to FIG. 3, the electro-hydraulic combined device of the present embodiment includes an electrical insulator 2, an electro-hydraulic joint supply base 3, a terminal of electro-hydraulic joint supply pipes 8, a flushing fluid container 15 and two electro-hydraulic joint supply pipes 16.

The electrical insulator 2 is fixedly connected with a spindle shell 1 of a spindle of the machine tool. It should be noted that the electrical insulator 2, such as a spindle seat, is a non-rotatable part on the spindle. A top end of the electro-hydraulic joint supply base 3 is fixedly connected with the electrical insulator 2. A connection port of a working fluid supplying pipe 4 and a binding post 5 are arranged on the electro-hydraulic joint supply base 3. The connection port of the working fluid supplying pipe 4 communicates with a working fluid container. A pressure pump is arranged on a pipeline between the connection port of the working fluid supplying pipe 4 and the working fluid container. And, working fluid in the working fluid container is pumped through the connection port of the working fluid supplying pipe 4 and into the electro-hydraulic joint supply base 3 by the pressure pump. The binding post 5 is used to be electrically connected with a power supply.

A bottom end of the electro-hydraulic joint supply base 3 is provided with a terminal connection port 6. The connection port of the working fluid supplying pipe 4 and the terminal connection port 6 communicate with a fluid channel in the electro-hydraulic joint supply base 3. When the terminal connection port 6 is snap-engaged or coupled with a top end of the terminal of the electro-hydraulic joint supply pipes 8, the fluid channel in the electro-hydraulic joint supply base 3 communicates with a fluid channel in the terminal 8. A joint of the terminal connection port 6 and the terminal 8 is sealed. A sealing ring 7 is arranged between the terminal connection port 6 and the terminal 8. An area of the sealing ring 7 is less than an area of a contact surface between the terminal connection port 6 and the terminal 8.

The fluid channel of the terminal 8 further communicates with a flushing fluid container 15 on an electrode shank 17 for electro machining through the two electro-hydraulic joint supply pipes 16. The electrode shank 17 for electro machining includes the flushing fluid container 15, rotating mechanisms 12, a hollow rotating shaft 11, and an electrode connection port 14. The hollow rotating shaft 11 is fixedly connected with the spindle through a connection port of the spindle shank 9, and is capable of being driven by the spindle to rotate. An electrode is fixedly connected with a bottom end of the hollow rotating shaft 11 through the electrode connection port 14. A fluid guide hole communicating with the flushing fluid container 15 is formed in a side wall of the hollow rotating shaft 11. The fluid guide hole communicates with a fluid channel inside the hollow rotating shaft 11. The fluid channel inside the hollow rotating shaft 11 communicates with the electrode through a working fluid channel in the electrode connection port 14 via a shaft end opening. The electrode connection port 14 is of a hollow structure. And the working fluid channel and an electrode fixing surface are arranged in the middle. And, the electrode is fixed at the bottom end of the hollow rotating shaft 11 through the electrode connection port 14. An upper end and a lower end of the flushing fluid container 15 are each provided with one rotating mechanism 12. The hollow rotating shaft 11 is rotatably fitted with the flushing fluid container 15 through the two rotating mechanisms 12. The rotating mechanisms 12 seal the upper end and the lower end of the flushing fluid container 15. The rotating mechanisms 12 are sealed itself. The flushing fluid container 15 is connected with outer rings of the rotating mechanisms 12. The hollow rotating shaft 11 is connected with inner rings of the rotating mechanisms 12. The two rotating mechanisms 12 respectively seal the upper end and the lower end of the flushing fluid container 15.

The connection port of the working fluid supplying pipe, the first fluid channel in the electro-hydraulic joint supply base, the terminal connection port, the second fluid channel in the terminal, the electro-hydraulic joint supply pipes, and a third fluid channel 18 in the electrode shank 17 for electro machining jointly form a working fluid channel.

The binding post 5, the electro-hydraulic joint supply base 3, the terminal 8, the electro-hydraulic joint supply pipes 16, the flushing fluid container 15, the rotating mechanisms 12, and the hollow rotating shaft 11 are all conductive and electrically conducted. The electrode shank 17 and the connection port of the spindle shank 9 are insulated from each other by means of providing an insulation layer 19 (or the insulation may be realized by other solutions as long as it is capable of ensuring that the machining electrode shank and the spindle are insulated from each other) between the electrode shank and the connection port of the spindle shank 9. A universal spacing groove 10 is formed on an outer side wall of the connection port of the spindle shank 9, and an electrode spacing groove 13 is formed on an outer side wall of the flushing fluid container 15.

In the present embodiment, the electro-hydraulic joint supply base 3 is connected and fixed to the spindle seat or a non-rotatable part on an end surface of the spindle or a side surface through an insulation bottom plate and is kept stationary during electro machining. The electro-hydraulic joint supply base 3 is of a hollow structure and is made of a conductive material. The connection port of the working fluid supplying pipe 4 is formed in a side surface or a top surface of the electro-hydraulic joint supply base 3. A working fluid supplying pipe is connected with the connection port of the working fluid supplying pipe 4. During machining, the working fluid enters a fluid channel in the electro-hydraulic joint supply base 3 through the connection port of the working fluid supplying pipe 4. The electro-hydraulic joint supply base 3 is additionally provided with the power binding post 5. A power line for electro machining is connected with the binding post 5. During machining, an output current of a pulse power supply flows through the entire electro-hydraulic joint supply base 3 via the binding post 5. The lower part of the electro-hydraulic joint supply base 3 is provided with the terminal connection port 6 of an electrode clamping shank. The terminal connection port 6 is of a hollow structure, so as to allow the terminal 8 to be plugged. During mounting of an electrode shank, the terminal 8 is plugged into the terminal connection port 6 to form a channel for the working fluid and to conduct current. After the terminal is plugged into the terminal connection port 6, under the action of a tool changing mechanism or a manually applied thrust, an outer side surface of the terminal 8 and an inner surface of the terminal connection port 6 are in full contact with each other, and thus a pressure therebetween may be generated, so as to ensure sealing and full-contact electric conduction.

An electric conduction channel in the electro-hydraulic combined device of the present embodiment is provided, and the electricity flows through the binding post 5, the electro-hydraulic joint supply base 3, the terminal connection port 6, the terminal 8, the electro-hydraulic joint supply pipes 16, the flushing fluid container 15, the rotating mechanisms 12, the hollow rotating shaft 11, the electrode connection port 14, and the electrode in sequence. The working fluid channel is provided, and the working fluid flows through the pressure pump, the working fluid supplying pipe, the connection port of the working fluid supplying pipe 4, the fluid channel in the electro-hydraulic joint supply base 3, the terminal connection port 6, the terminal 8, the electro-hydraulic joint supply pipes 16, the flushing fluid container 15, the fluid guide hole in the side wall of the hollow rotating shaft 11, the fluid channel in the hollow rotating shaft 11, the electrode connection port 14, and the electrode in sequence. The arrows in FIG. 3 represent a flowing direction of the working fluid in the electro-hydraulic joint supply base 3. It should be noted that the flushing fluid container 15 is overall sealed, and the middle part of the hollow rotating shaft 11 is immersed in the working fluid in the flushing fluid container 15. So, even if the hollow rotating shaft 11 ceaselessly rotates, the working fluid in the flushing fluid container 15 will also continuously enters the fluid channel in the hollow rotating shaft 11 through the fluid guide hole.

A top end of the terminal of electro-hydraulic joint supply pipes 8 has a certain taper, which plays an introduction role and facilitates directly enabling fast connection with the terminal connection port 6, Furthermore, after the connection, the electro-hydraulic joint supply pipes 16 provide an auxiliary support, thus improving the rigidity and accuracy of the system. Because a limit fork on a tool magazine base clamping unit as well as a limit fork on a tool changing mechanical arm are coupled with the electrode spacing groove 13 on the outer wall of the flushing fluid container 15, an angle between the hollow rotating shaft 11 and the flushing fluid container 15 below the electrode shank is fixed before and after the tool changing. In this way, it is possible to avoid a failure of plugging the tool into an electrode connection port due to the relative rotation between the hollow rotating shaft 11 and the flushing fluid container 15 before and after clamping.

The electro-hydraulic combined device of the present embodiment may further enhance the flushing effect and make machining more stable in addition to providing a connection method for the power supply. The electrode shank and the electro-hydraulic joint supply base 3 in the electrode-hydraulic joint supply device of the present embodiment have compact sizes and will not affect the cutting function of the existing machine tool. The shank may be very short, which has little impact on an axial stroke (z-directional stroke) of the machine tool. Thus, the machining range of the machine tool is greatly ensured. Above all, the present embodiment is favorable for realizing an automatic tool changing function, and the electro machining including electric arc machining and the spark-erosion machining is highly integrated with the traditional cutting on one machine tool.

In the description of the present disclosure, it should be noted that orientations or positional relationships indicated by the terms "top", "bottom" and the like are based on orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms should not be construed as limiting the present disclosure.

In this specification, specific embodiments aim to illustrate the principle and implementation of the present disclosure. The explanation of the above embodiments is only used to help understand the method and its core idea of the present disclosure. According to the idea of the present disclosure, there will be some changes in the specific implementation and application scope for those skilled in the art. To sum up, the contents of this specification should not be construed as limiting the present disclosure.

What is claimed is:

1. An electro-hydraulic combined device, comprising an electrical insulator, an electro-hydraulic joint supply base, a terminal of electro-hydraulic joint supply pipes, and the electro-hydraulic joint supply pipes, wherein the electrical insulator is fixedly connected with a spindle shell or a spindle seat of a spindle of a machine tool; a top end of the electro-hydraulic joint supply base is fixedly connected with the electrical insulator; a connection port of a working fluid supplying pipe and a binding post are arranged on the electro-hydraulic joint supply base; a bottom end of the electro-hydraulic joint supply base is provided with a terminal connection port; the connection port of the working fluid supplying pipe and the terminal connection port are communicated with a first fluid channel in the electro-hydraulic joint supply base; when the terminal connection port is snap-engaged with a top end of the terminal of the electro-hydraulic joint supply pipes, the first fluid channel in the electro-hydraulic joint supply base is communicated with a second fluid channel in the terminal; the second fluid channel in the terminal is further communicated with a flushing fluid container on an electrode shank for electro machining through the electro-hydraulic joint supply pipes; the binding post, the electro-hydraulic joint supply base, the terminal, the electro-hydraulic joint supply pipes, and the electrode shank for electro-machining are conductive and electrically conducted; the electrode shank for electro machining and a connection port of a spindle shank are insulated from each other; by an insulation layer therebetween; the connection port of the working fluid supplying pipe, the first fluid channel in the electro-hydraulic joint supply base, the terminal connection port, the second fluid channel in the terminal, the electro-hydraulic joint supply pipes, and a third fluid channel in the electrode shank for electro machining jointly form a working fluid channel; the connection port of the working fluid supplying pipe, the electro-hydraulic joint supply base, the terminal connection port, the terminal, the electro-hydraulic joint supply pipes, the electrode shank for electro machining, and an electrode jointly form an electric conduction channel; the electro-hydraulic combined device serves as a fluid passage and an electric conduction channel.

2. The electro-hydraulic combined device according to claim 1, wherein the connection port of the working fluid supplying pipe is configured to communicate with a working fluid container, and working fluid in the working fluid container is pumped through the connection port of the working fluid supplying pipe and into the electro-hydraulic joint supply base by a pressure pump.

3. The electro-hydraulic combined device according to claim 1, wherein the binding post is configured to be electrically connected with a power supply.

4. The electro-hydraulic combined device according to claim 1, wherein a joint of the terminal connection port and the terminal is sealed when the terminal connection port is snap-engaged with the top end of the terminal.

5. The electro-hydraulic combined device according to claim 4, wherein a sealing ring is arranged between the terminal connection port and the terminal to prevent the working fluid from leaking, and the sealing ring is configured to not affect direct contact for electric conduction between the terminal connection port and the terminal.

* * * * *